(12) United States Patent
Orko et al.

(10) Patent No.: US 7,883,122 B2
(45) Date of Patent: Feb. 8, 2011

(54) DEVICE AND METHOD FOR FORMING ELONGATED MATERIAL

(75) Inventors: Samuli Orko, Helsinki (FI); Tero Liimatainen, Helsinki (FI)

(73) Assignee: Bondustry Oy, Helsinki (FI)

( * ) Notice: Subject to any disclaimer, the term of this patent is extended or adjusted under 35 U.S.C. 154(b) by 187 days.

(21) Appl. No.: 12/095,287

(22) PCT Filed: Jun. 29, 2006

(86) PCT No.: PCT/FI2006/050302

§ 371 (c)(1),
(2), (4) Date: Jun. 8, 2008

(87) PCT Pub. No.: WO2007/063175

PCT Pub. Date: Jun. 7, 2007

(65) Prior Publication Data

US 2008/0315023 A1    Dec. 25, 2008

(30) Foreign Application Priority Data

Nov. 29, 2005  (FI) ................................. 20051219

(51) Int. Cl.
*D03J 3/00*  (2006.01)
(52) U.S. Cl. ...................................................... 289/17
(58) Field of Classification Search ................ 289/1.2, 289/2, 17
See application file for complete search history.

(56) References Cited

U.S. PATENT DOCUMENTS

| 876,573 | A | | 1/1908 | Myers |
|---|---|---|---|---|
| 2,705,656 | A | * | 4/1955 | Shockey ..................... 289/17 |
| 2,913,270 | A | * | 11/1959 | Sachsenroder, Sr. et al. ... 289/2 |
| 3,336,063 | A | * | 8/1967 | Remmers ..................... 289/2 |
| 3,490,801 | A | * | 1/1970 | Feighery ..................... 289/2 |
| 3,591,217 | A | * | 7/1971 | Melzer ........................ 289/2 |
| 4,094,342 | A | * | 6/1978 | Nishikawa et al. ......... 140/93.2 |
| 4,572,555 | A | | 2/1986 | Henderson, Jr. |

FOREIGN PATENT DOCUMENTS

| GB | 799 314 A | 6/1958 |
|---|---|---|
| WO | 2005/072521 A1 | 8/2005 |

\* cited by examiner

*Primary Examiner*—Shaun R Hurley
(74) *Attorney, Agent, or Firm*—Young & Thompson

(57) ABSTRACT

This invention relates to a device and a method for forming elongated material. A device (824-864) according to the present invention for forming elongated material, is characterised in that the device comprises a track (821) for guiding the material in the device, wherein the track is arranged to guide the movement of the material into a desired form when the material is fed into the device, and the device comprises an opening (823, 824) along the entire length of the track for removing the elongated material from the device after the formation. With this invention it is possible to make knots and other structures of desired geometry easily and efficiently.

19 Claims, 6 Drawing Sheets

Prior Art 41          42

DEVICE AND METHOD FOR FORMING ELONGATED MATERIAL

BACKGROUND OF THE INVENTION

This invention relates to a device and a method for forming elongated material. One example for applying the invention is forming knots and other closed geometries to lines or wires.

DESCRIPTION OF THE RELATED ART

In many applications it is necessary to make formation into elongated material. For example, knots are very efficient and reliable means for attachment. One application where knots are quite useful is fishing. FIG. 1 illustrates a common clinch knot used e.g. in fishing. However, often forming e.g. wires into such geometric forms is difficult, and thus there are often difficulties in forming knots manually. A fishing line is usually quite thin, and therefore hands are relatively large means for making knots when e.g. attaching lures with a fishing line. Making knots into a fishing line also requires very accurate sight. Sometimes the circumstances may also be challenging in fishing. The weather may be cold, which tends to make hands stiff and make the procedure of making knots even more difficult. When fishing in a boat, the boat may also swing hard due to winds when knots need to be made.

Another application where knots are actively used is medicine, such as surgical operations. In these applications it is highly important that the procedure of tying knots is reliable and does not take much time.

Due to its potential efficiency, reliability and low cost, knots would be a very good means of attachment for various other applications, too. However, the closed geometry of the knots makes the formation of knots difficult in mass production and industrial environment. Besides knots, this problem relates to formation of elongated material into other specified geometries, too. The quality and repeatability of the manually made knots may also vary a lot, due to varying skills and experience of the person as well as due to potential errors.

There are several kinds of manual tools for tying knots described in the prior art. Patent documents U.S. Pat. No. 4,403,797, U.S. Pat. No. 4,572,554 and NL 9300251 disclose examples of such prior art tools. These tools mainly provide a mechanical support for a line or the member to be tied, such as a fishing hook. However, the process of making a knot still requires manual handling, forming and tying of the line. The tools therefore do not solve the basic difficulties of the manual tying.

There are also automatic tools for tying knots for an industrial environment. Document WO 96/00135 discloses such a prior art device. However, such knot tying machines tend to be very complicated, including a large number of moving parts. Such machines are therefore quite expensive and require active maintenance.

SUMMARY OF THE INVENTION

It is the objective of the present invention to create a solution wherein the above-mentioned problems are eliminated or reduced. The objective of the invention is therefore to provide a device and method for forming elongated material, which easy, efficient and reliable to use in various environments.

The device for forming elongated material of the invention is characterized below, and the method for forming elongated material of the invention is also characterized below. Some inventive embodiments are also discussed in the descriptive section of the present application. The inventive content may also consist of several separate inventions, especially if the invention is considered in the light of expressions or implicit sub-tasks or from the point of view of advantages or categories of advantages achieved. In this case, some of the attributes below may be superfluous from the point of view of separate inventive concepts. The features of the various embodiments can be applied within the framework of the basic inventive concept in conjunction with other embodiments.

Features, functionality and advantages of some advantageous embodiments are briefly described in the following.

According to the invention elongated material is led along a track to provide a predetermined form for the material. The material is preferably conveyed through the track by pushing the material. Preferably, the material is kept in the track at least partly due to the internal tension of the elongated material. Most preferably, the material is kept on the track essentially by the internal tension of the elongated material. This allows feeding the material by essentially pushing. This also allows a structure of the device where the material moves on a track, which is open to a release cavity. The width of the opening between the track and the release cavity is thus preferably higher than the width of the elongated material. The material can thus be easily removed from the track via an opening provided in the device.

The device according to the invention preferably includes a release cavity, which is defined by the structure of the device. With a device according to the invention it is possible to form elongated material into desired forms easily, and without any manual operations which would require high accuracy. A good reliability can also be achieved. It is also not necessary to use additional auxiliary equipment such as long guide elements for conveying the elongated material into the desired form.

According to one advantageous embodiment of the invention an object is attached to the elongated material by a knot or other means. The object is brought and temporarily attached near to the material track for the attachment. This way an object can be attached by a knot to the elongated material, but also other means of attachment are possible.

For example, in one or several points of the track there may be a section for an attachment object such as an attachment loop of a lure. In this case the track may lead the material through the attachment loop. The section for the attachment loop is also connected to a release opening.

The attachment object can be temporarily fixed to the device e.g. with a fixing nip. The nip may comprise two cones inside each other. The feeding cone of the input side centralises the material exactly in the middle of the feeding track if the object has a closed attachment loop. If the object has a straight attachment axis, the nip keeps the shaft inside the material track.

The flexible axial material can be fed into the device at the input hole. The material moves along the track within the 3-dimensional space when the material is fed further. The track is mostly closed in the exact direction where the internal tension of the material tends to lead the material. Instead, the track is slightly curved in order to maintain the material on the track.

Each track point of one track loop is united with a release opening, which preferably has a higher width than the material. In the middle of the device there may be a release cavity, and the material is able to move via the release opening into the release cavity when the material is pulled out. Thus the track has in all its points a release path into the release cavity, and the whole material can be pulled away from the track into the release cavity at a later stage of the process. However, when the material is fed into the device the normal tension of the material makes the material remain within the track when it is pushed further. According to a preferred embodiment, the track is directly open into a release cavity so that the material can be pulled from the track to the release cavity with a minimal force. In such an arrangement the opening between the track and the release cavity is actually just an opposite, open surface of the track.

In some preferable embodiments the device comprises means for pushing the elongated material into the track. Such means may be a pair of rolls, one of which is rotates with a manual actuator or an electric motor. Such arrangements provide a steady feed of the material, they make feeding the material easier, and the rolls also provide pretension for the elongated material, and thus assist the movement of the material in the track. The roll may be arranged to aid the movement of the material also in other points of the track.

The feeding of the material is stopped when the end of the material comes out from the output opening. The input and output openings are also connected to the release cavity. The material is tightened by pulling from its one or both ends. When the material tightens it also comes out from the track via the release openings into the release cavity. A tight knot is thus formed within the release cavity when the material is tightened by pulling. Also the object becomes attached to the material.

After the knot has been formed and tightened, it may be possible to cut the free end of the line into a desired length with an optional cutting means of the device. The spring nip can then be released in order to release the object from the device. Next the knot and the object are pulled away from the device through the release cavity. A knot has been formed around the attachment part of the object. The device may also have a pin or similar means for adjusting the size of the knot loop which is formed at the attachment part of the object.

The present invention makes it possible to easily make knots with even demanding geometries. It is also possible to use materials which have not conventionally been used in making knots. Due to the improved reliability and processability knots can be used for replacing many other types of attachments, such as shackles and cable heads, without compromising the strength of the connections.

For example, the invention can be applied for leading material into a desired form for other attachment procedures than knots. When the material is in its place within the track, it is possible to attach other parts to the material using e.g. welding, soldering or riveting. The material can then be removed from the device together with the attached part. This way it is possible to assemble 3-dimensional constructions. One example of such suitable applications is manufacturing portable, foldable furniture, such as children's travel beds, by forming a metal frame into a mould according to the invention, providing the required attachments within the mould, and removing the furniture frame e.g. after opening the mould.

The solution is very easily applicable in industry and mass production. The inventive device can be integrated with clamps, winches and cutting tools. This way it is possible to provide automated machinery for making knots. A simple axial feed can be provided directly from a reel of material as well as automated tightening, cutting and pulling out from the device. This way the whole process can be achieved without using complicated machinery such as industrial robots. The technical applicable fields include e.g. industrial sectors such as building, electronics, machinery, assembly, installation, maintenance ship building, car manufacturing, aviation, elevators and cranes, furniture, clothing, health care or fishing equipment. Besides connecting lines to various devices, knots are also useful for connecting two wires, cables, lines ropes etc. to each other.

The term "elongated material" is used in this application to mean materials, preferably axial materials, like lines, wires, cables, threads etc, in which the relation between length and diameter/width is high in the intended use.

The term "forming" is used in this application to mean making material into a certain form, such as making a thread into a form of a knot.

A "device" for forming the elongated material may e.g. have an appearance of a mould, but it may also have other kinds of alternative constructions and appearances.

BRIEF DESCRIPTION OF THE DRAWINGS

In the following, the invention is described in more detail by means of the attached drawings in which.

DESCRIPTION OF THE PREFERRED EMBODIMENTS

Figure 1:
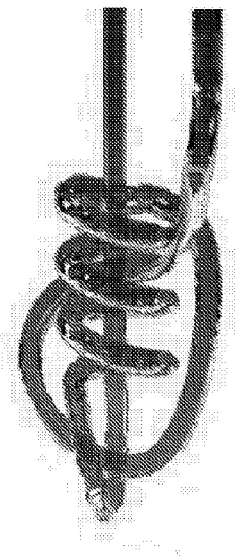
FIG. 1 illustrates a structure of a typical clinch knot.

FIG. 1 was already mentioned in the prior art description. Figure one shows an exemplary geometry of a knot, and such geometry is also applied in the following embodiment. Next an exemplary inventive principle of providing a form of a knot is described referring to FIGS. 2-7. Then preferred exemplary devices according to the invention are described referring to FIGS. 8 and 9. Finally, a method according to the invention is described referring to FIG. 10.

Figure 2A:
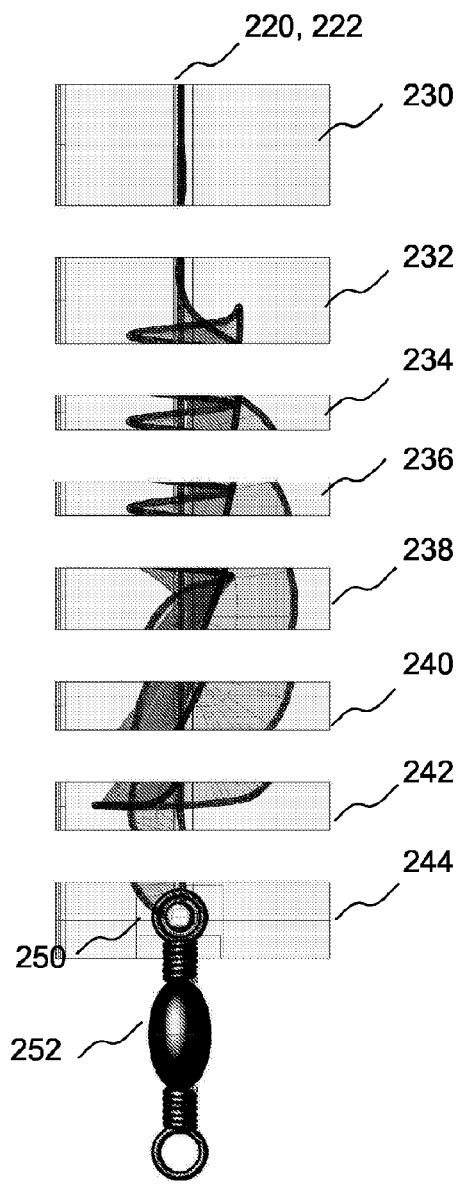
FIG. 2a illustrates side view of an exemplary device according to invention.
Figure 2B:
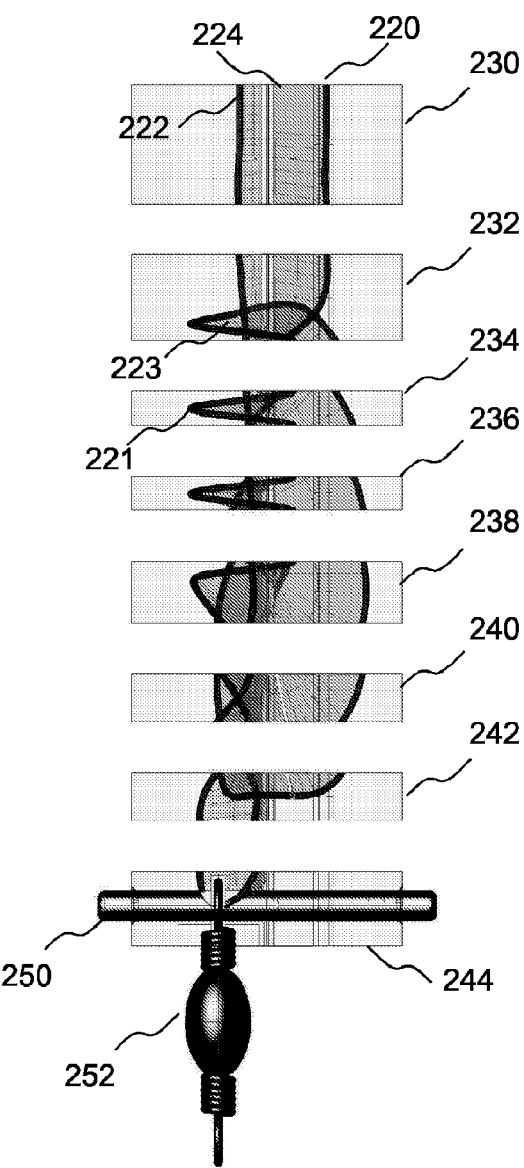
FIG. 2b illustrates front view of an exemplary device according to invention.
Figure 2C:
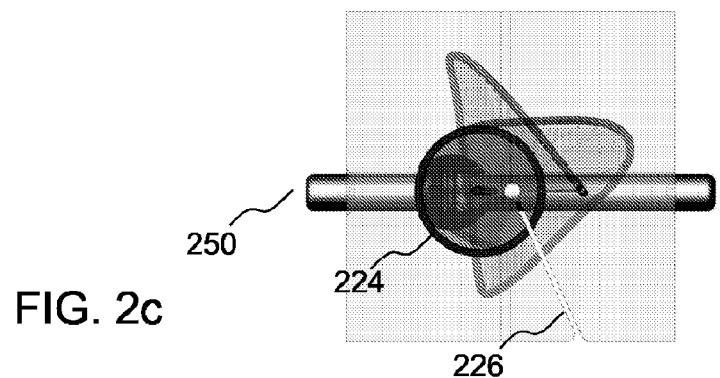
FIG. 2c illustrates top view of an exemplary device according to invention.
Figure 3:
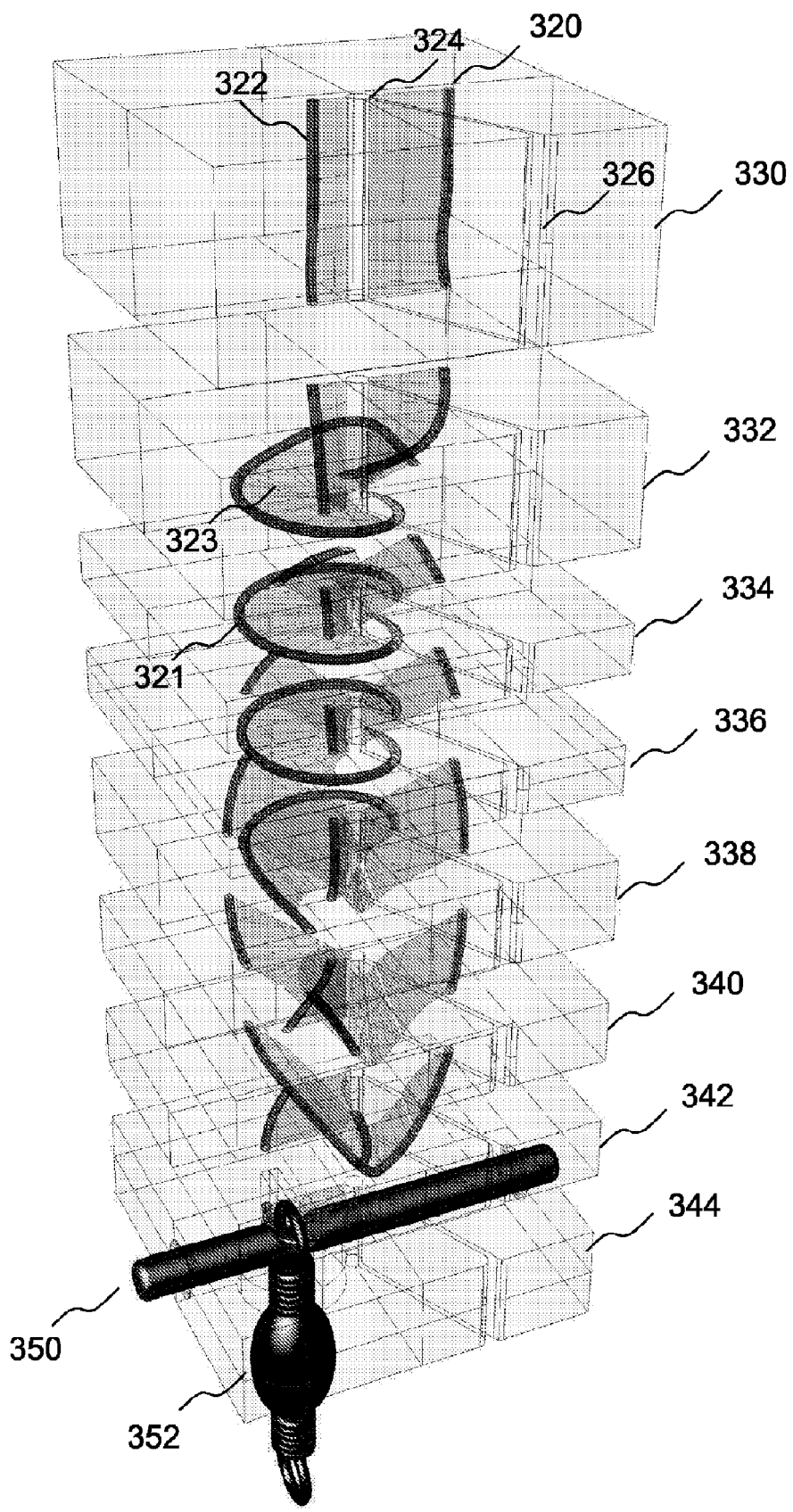
FIG. 3 illustrates perspective view of an exemplary device according to invention.

FIGS. 2a, 2b, 2c and 3 illustrate an exemplary device according to the present invention for making a clinch knot. FIG. 2a shows a side view, FIG. 2b shows a front view, and FIG. 2c shows a top view of the device. FIG. 3 shows the construction in a perspective view.

This device is made of eight blocks 230-244, 330-344. The blocks are attached to each other to form a unitary device. The blocks are illustrated in the Figures slightly separated for a better clarity. Such blocks can be manufactured with one integrated mould using e.g. injection moulding.

The elongated material such as a fishing line is input to the start of a track, 220 and 320. The material is fed so that the end of the material goes through the block 230, 330 and enters the block 232, 332. The material proceeds all the way until block 242, 342, where it turns upward. The material then reaches block 232, 332 again and has made a large loop.

Next the material proceeds to small loops. The first loop is made inside block 232, 332, the next small loop is made inside block 234, 334 (track 221, 321), and the final loop is made in blocks 236-238, 336-338. After the small loops the end of the material proceeds through block 240, 340 to block 242, 342. In this block there is an object 252, 352, which is to be knotted with the elongated material. The object is temporarily attached to the device with a spring nip 250, 350. The material transmits the hook of the object and proceeds upwards. The end of the material finally enters the output hole 222, 322 of the track.

When the end of the material has come out of the output hole 222, 322, the material is carefully pulled. This tightening of the material makes it slip into the opening, such as a release plane 223, 323, and further to the release cavity 224, 324 of the device. When all the material is within the release cavity, the knot will get tightened as the material is further pulled. Next the knotted object 252, 352 is released from the spring nip 250, 350. The material, which is inside the release cavity, can be pulled out through a release aperture 226, 326 which is made from the release cavity to the outside of the device along one side of the device.

One must note that the FIGS. 2a, 2b, 2c and 3 show just an illustrative example of a device according to the invention. For example, routes of the tracks are not optimised in this illustration. In order to make a line or thread move smoothly in the track it is advantageous to optimise the radius of curvature of the track routes. Optimising is also necessary in order to keep the line/thread on the track through the whole track. It is also necessary to take into account different materials, diameters and other properties of the lines/threads which may be used with the device.

Figure 4:
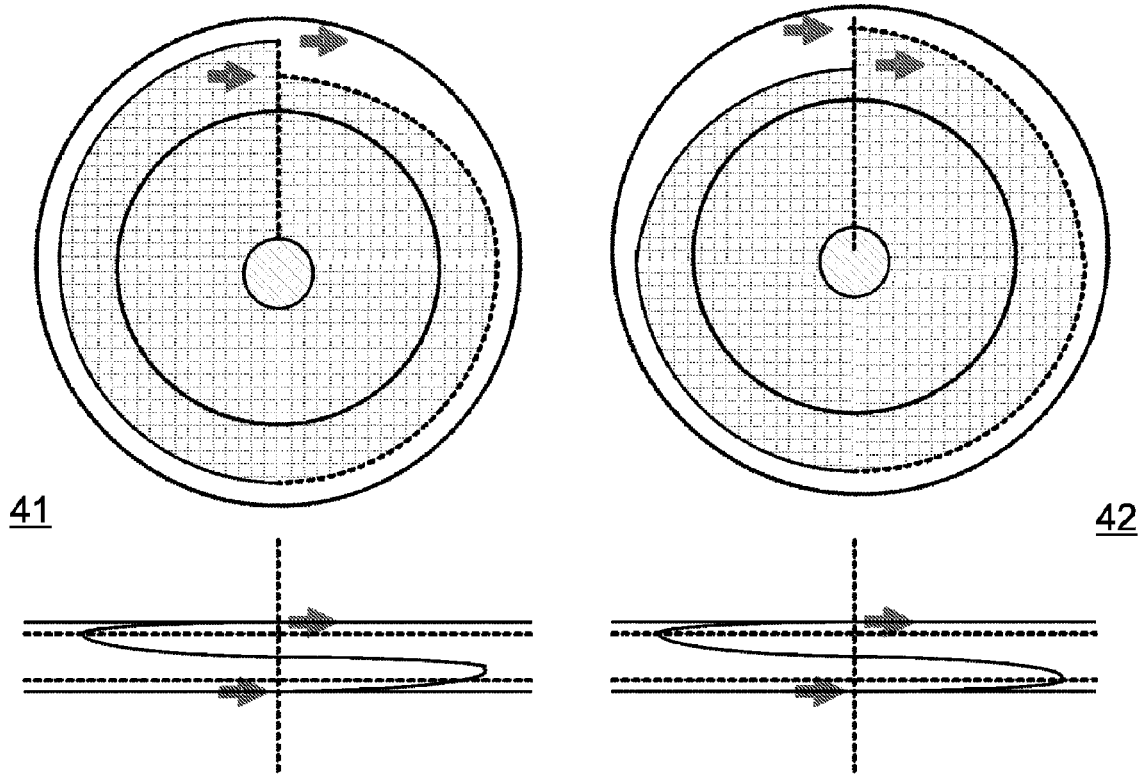
FIG. 4 illustrates a stackable module for providing tracks for material loops in an exemplary device according to the invention.

FIG. 4 illustrates one example of a module block which can be used for providing two loop tracks within the device. Such blocks can be stacked one above another. The left hand side of the figure illustrates the lower part 41 of the block. The material comes to the inner track from the block below. The material makes a full loop along the track and comes to the outer track at the upper surface of part 41. The upper part 42 of the block is illustrated at the right side of FIG. 4. This part receives the material from the part 41 at the outer track. The material follows the track for the whole loop and comes to the inner track. The block can thus feed the material to the following block of the same type. This way it is possible to achieve a desired number of loops by stacking a suitable number of blocks above each other.

Figure 5A:
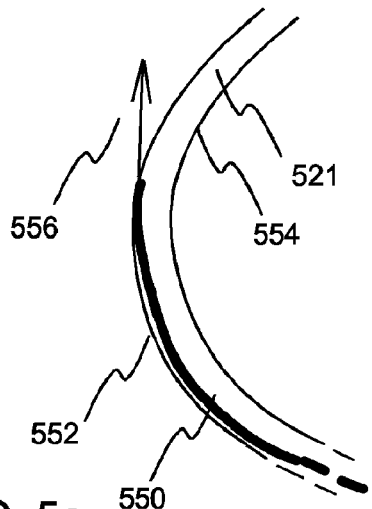
FIG. 5a illustrates elongated material in a track when the material is fed into the device by pushing.

FIG. 5a illustrates an example of elongated material 550, such as thread or line, in a track 521. When the material is fed into the device by pushing, the internal tension of the material makes the pushing to cause a force in the end of the material with a direction 556 out of the track. When the material is pushed, the end of the material slides along the outer edge 552 of the track. Thus the material stays within the track.

Figure 5B:
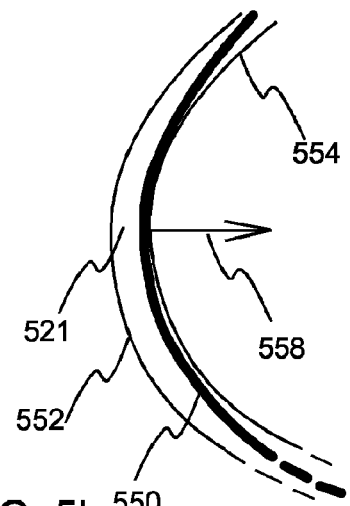
FIG. 5b illustrates elongated material in the track when the material is being pulled out from the track.

FIG. 5b illustrates an example of elongated material 550 in a track 521, wherein the material is being pulled out from the track. Pulling the material causes a force with a direction 558 out from the inner edge 554 of the track. Since according to the present invention there is an opening at the inner edge of the track, the material can slide out from the track when it is pulled.

Figure 5C:
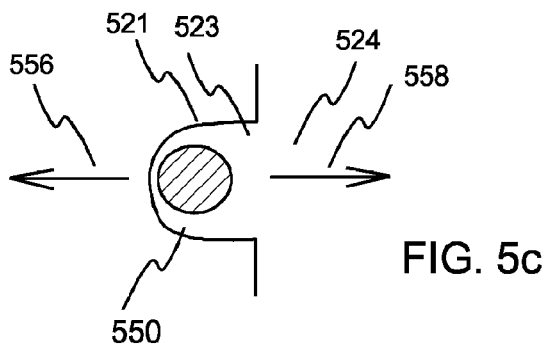
FIG. 5c illustrates a sectional view of elongated material in a track, which has a straight opening to a release cavity.

FIG. 5c illustrates an exemplary section view of elongated material in a track. The arrow 556 shows a direction of a force in the material which keeps the material in the track when the material is pushed into the device. Arrow 558 shows the direction of a force in the material which moves the material into the opening 523 and further to the cavity 524 when the material is pulled. In this embodiment the opening 523 has an approximately same width as the track 521. Actually, the opening 523 is just an opposite, open end of the track, and the release cavity 524 is adjacent to the track 521. Thus the material can be pulled out from the track very easily. This structure is also easy to manufacture with only a few separate device blocks.

Figure 5D:
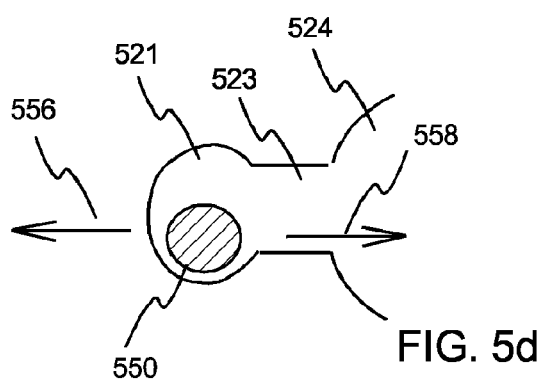
FIG. 5d illustrates a sectional view of elongated material in a track, which has a narrowed opening.

FIG. 5d illustrates an exemplary section view of elongated material in a track. The arrow 556 shows a direction of a force in the material which keeps the material in the track when the material is pushed into the device. Arrow 558 shows the direction of a force in the material which moves the material into the opening 523 and further to the cavity 524 when the material is pulled. In this embodiment the opening 523 has a slightly smaller width than the track 521. Thus the material stays better in track when pushing the material through the track, but it may require a larger force when pulling the material out from the track. This structure is also more difficult to manufacture compared to the embodiment of FIG. 5c. The width of the opening plane 523 should naturally be larger than the diameter of the elongated material 550 for the material to move through the opening into the cavity 558.

Figure 5E:
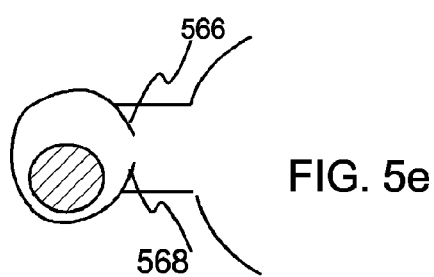
FIG. 5e illustrates a sectional view of a track wherein there are flexible edges between the track and an opening.

FIG. 5e illustrates an embodiment where the track has flexible edges 566 and 568 which help to keep the elongated material within the track when the material is pushed. When the material is pulled, the flexible edges bend in order to let the material slide into the opening and further into the cavity. It is also possible that the flexible edges touch each other when the material is not pulled. Thus the opening from the track is formed when the material is pulled.

Figure 6:
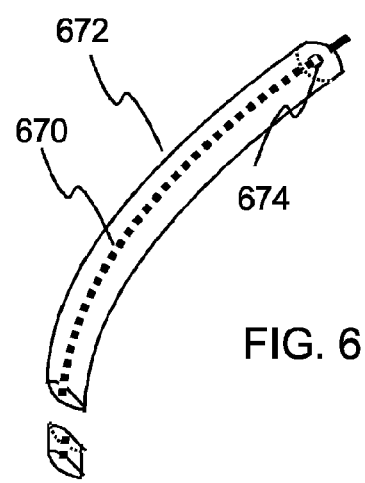
FIG. 6 illustrates an auxiliary device inside elongated material.

FIG. 6 illustrates an embodiment where an auxiliary device 670 is used for pushing the material 672 into the device. The auxiliary device is also elongated material such as wire, which has a sufficient internal tension for keeping it in the track during the pushing. The material to be formed can be material which does not have a large internal tension, such as thread. Thus it is possible to extend the variety of applicable elongated materials by using an auxiliary device.

The auxiliary wire 670 is connected to the thread 672 at their ends, 674. The wire is then pushed into the device together with the thread 672. After the combination of wire and thread has been fed through the whole track, the connection between the wire and the thread is disconnected. The wire can then be pulled out from the device. After pulling out the auxiliary wire the thread can be pulled to get the thread to the cavity and to tighten a knot. If the diameter of the combination of the wire and the thread is larger than the width of the opening plane, the combination cannot come out from the track to the opening plane. When the auxiliary wire has been pulled out, the remaining thread should have a diameter which is smaller than the width of the opening plane.

Figure 7:
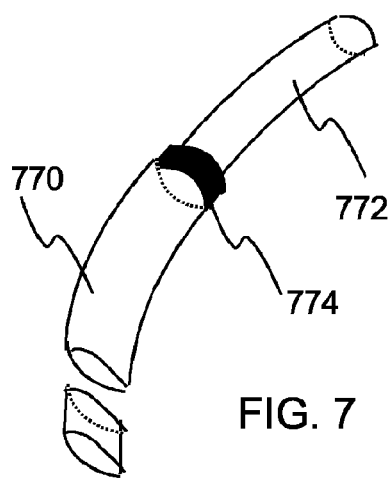
FIG. 7 illustrates an auxiliary device connected to elongated material at their ends.

FIG. 7 illustrates another embodiment where an auxiliary device 770 is used for feeding the material 772 into and through the track of the device. In this embodiment the auxiliary device, such as wire 770 is first fed into the device along the track. When the end of the auxiliary wire has come out from the device, the end of the material, such as thread, is connected to the end of the wire. The connection can be made e.g. using a sleeve 774. It is also possible to have a hole at the end of the auxiliary wire so that the thread can be attached to the wire through the hole like to a needle.

When the ends of the auxiliary wire and the thread have been connected to each other, the auxiliary wire is pulled away from the device so that the thread is simultaneously pulled into the device. After the auxiliary wire has been pulled out of the device and the joint between the wire and thread has come out, the joint is disconnected. The thread can then be pulled out from the track through the opening planes and e.g. a knot can further be tightened.

It is advantageous to use an auxiliary device 770 which has a larger diameter then the width of the opening planes. This way the auxiliary device is kept securely within the track during the pushing and the pulling of the auxiliary device. The diameter of the elongated material should on the other hand be smaller than the opening planes so that the material can be pulled out from the track.

It is also advantageous to use an auxiliary device which has a rounded end. This makes the friction smaller when the auxiliary device is pulled along the track into the device.

There is a further embodiment for using auxiliary devices (not shown in Figures). In this embodiment a first, tubular auxiliary device is fed along the track through the device. Then the elongated material can be fed along the track inside the tubular auxiliary device through the main device. This feeding of the elongated material can be made directly or with a second auxiliary device according to FIG. 6 or FIG. 7. After the elongated material has been fed into the device, the tubular auxiliary device is removed before pulling the elongated material out from the track. The tubular auxiliary device can thus be used for providing a smoother way for the elongated material, and for avoiding the material to go out from the track to the opening plane during the feeding. It is advantageous that the tubular auxiliary device has a diameter which is larger than the width of the opening plane, so the tubular device remains securely within the track.

It must be noted that even if some auxiliary wire devices were described above, it is not necessary to use any auxiliary wire when the material is guided through the track in a device according to the invention. Actually, the easiest way of usage is achieved with a device according to the invention where no auxiliary wire is used for guiding the material through the track.

Figures 8A, 8B:
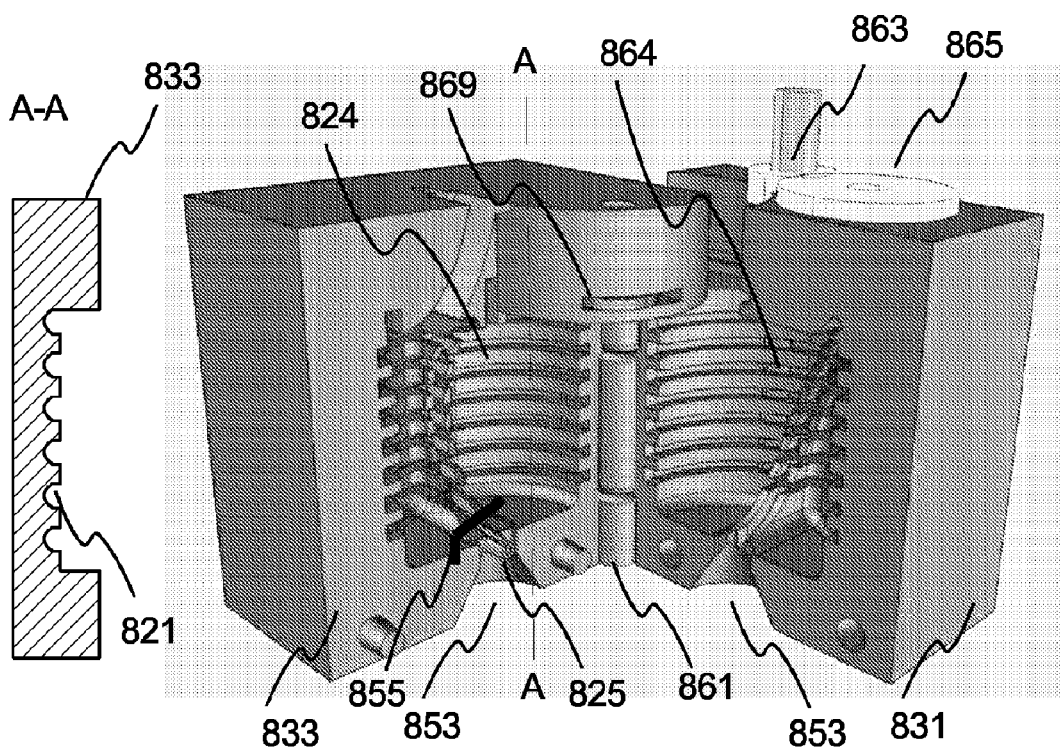
FIGS. 8A and 8B illustrate side views of another exemplary device according to the invention.

FIG. 8 illustrates another example of a device according to the present invention. The device comprises two blocks, 831 and 833. The two blocks are connected with a hinge 861, allowing the opening of the device as shown in the Figure. The device has a cavity 824, which has tracks at the sides of the cavity. The tracks 821 are open to the direction of the cavity as shown in the cross section view A-A of the block 833. If the tracks have such a cross section of half-circle with possibly straight sides, it is possible to produce the blocks using a simple, 3-axial mould, such as an injection mould. There is also a clear passage from the track into the cavity, which makes the material move freely when tightening a knot.

The material is led into the device by feeding the free end of the material through an opening into a track between two rolls 869. The first roll 869 rotates freely, while the second roll is rotated by gear wheels 863 and 865. The gear wheel may have means for manual rotation, such as a crank, or it may also be driven by a small electric motor which may be included in the device.

The rotation of the rolls 869 causes the material to be pushed onto the track. The material is pushed by the roll until the material has traveled through the track. While rotation of the rolls 869 causes the material to be pushed onto the track, the material is also pretensioned by the rolls, which reduces the risk of distortion of the material and substantially assists the material to stay within the track during the movement. There is also an extension 864 of the rotating roll, which extension intersects the bottom surface of the tracks. The roll 864 pushes the material further at each point where the roll touches the material. This way the obstructing effect of the friction between the material and the track is significantly decreased.

The roll is preferably made of slightly elastic material which has a high friction with the surface of the elongated material.

The device also has an opening 853 for inserting a loop of a lure, or other object to be tied. When the loop is in place, the track 825 of the material leads the material through the loop thus tying the loop with the knot being formed. The device may also have a pin 855 for adjusting and locking the knot loop into a desired clearance around the tied loop of the object. The knot is tightened around both the loop and the pin 855, so when the knot is removed from the pin, there will be a suitable clearance between the loop of the lure and the loop of the knot.

There are certain advantages relating to the structure which allows opening the device blocks. It is sometimes necessary to clean the device from the inside, and that is easily done when the device can be opened. It is also possible to remove the tightened knot from the device by opening the device instead of providing a clearance opening for removing the knot. However, the possibility to open the device easily is advantageous even if the device is provided with a separate clearance opening for removing the knot from the device.

Figure 9:
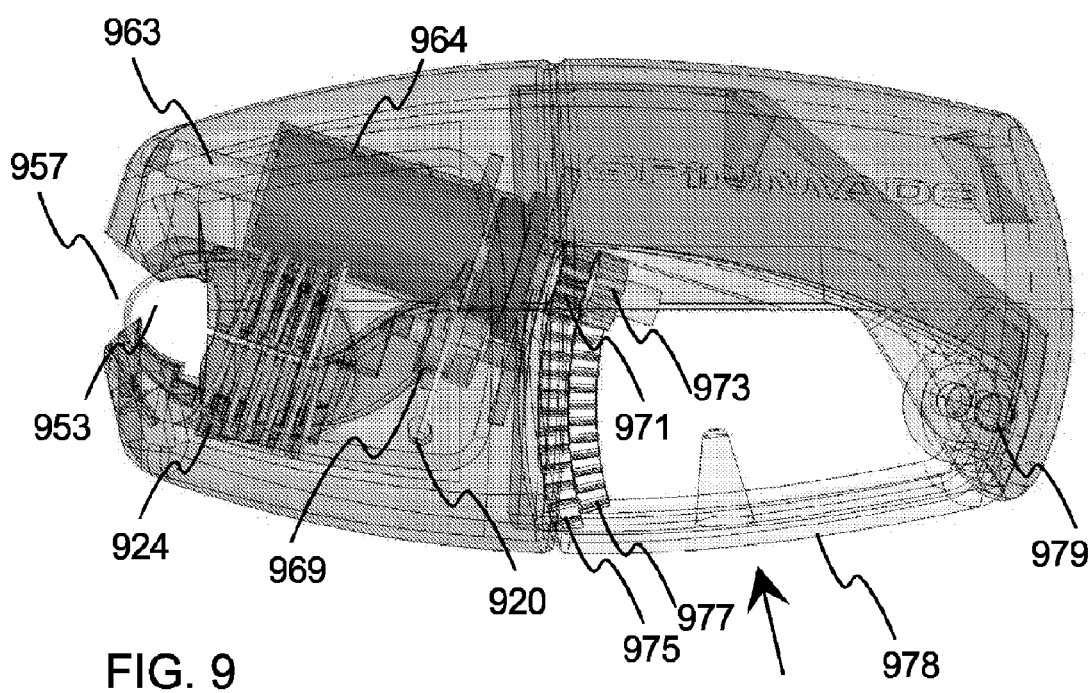
FIG. 9 illustrates side view of a further exemplary device according to the invention.

FIG. 9 illustrates a further exemplary device according to the present invention. The device has a cavity 924, which has a similar form as the cavity in FIG. 8, and which may preferably be opened for e.g. cleaning. There is a clear passage from the track into the cavity. The free end of elongated material is fed to the device at point 920. The material is led via a track between two rolls 964 and 969. The roll 969 rotates freely, while the roll 964 is rotated with a manual actuator. The rotation of the rolls causes the material to be pushed onto the track.

The manual actuator includes a handle 978, which is connected to the main body of the device with a hinge 979 and a spring included in the hinge. There is a ratchet mechanism for rotating the roll 964 by pressing the handle 978. When moving the handle in the direction of the arrow the movement of gear 975 causes the gear wheel 971 of the roll axis 963 to rotate. After the handle is moved to the end location and released, the spring of the hinge 979 moves the handle 978 to the starting position. While moving back a second gear 977 causes the second gear wheel 973 to rotate. The gears 975 and 977 are located at the opposite sides of the axis 963, and so they both make the roll 964 to rotate in the same direction.

The material is thus pushed by the roll 964 at the start of the track. The material is also pushed by the roll 964 at other points of the track, thereby reducing the effect of friction between the material and the track. The device also has a space 953 for e.g. a loop of a fishing lure. The material is led through the loop at point 957, forming a knot with the loop.

The knot can be removed from the device by e.g. opening the cavity blocks, or by pulling the line through an opening at the wall of the release cavity.

Instead of manual actuator, the roll 964 could alternatively be rotated by a suitable electric motor equipped with a electric power source, such as a battery.

The device may also have means for cutting the free end of the material into a desired length, such as 5-10 mm (not shown in the Figure). These means may be a blade of a suitable form so that it is easy to pull the material against the blade and that the blade does not hurt the user.

The structures of the devices according to the invention preferably have rounded edges and corners in such locations where the elongated material may touch during the use of the device. This is in order to avoid damaging the material which is processed, and to avoid sticking to the material inside the device.

It is also easy to make knots between two lines, ropes, wires etc with a device according to the invention. For example, using a device of FIG. 8, a line can be led through the device, but without inserting any object for attachment. The knot is made to the end of the line so that a loop remains at the end of the line. The loop is achieved e.g. with help of a pin 855. Then, after forming a knot in the first line, the knot loop of the first line is inserted into the device as an object for attachment. Then a knot is made with a second line, and the resulting knot thereby ties the loop of the first line. The ends of the two lines are thus attached to each other with knots.

Figure 10:
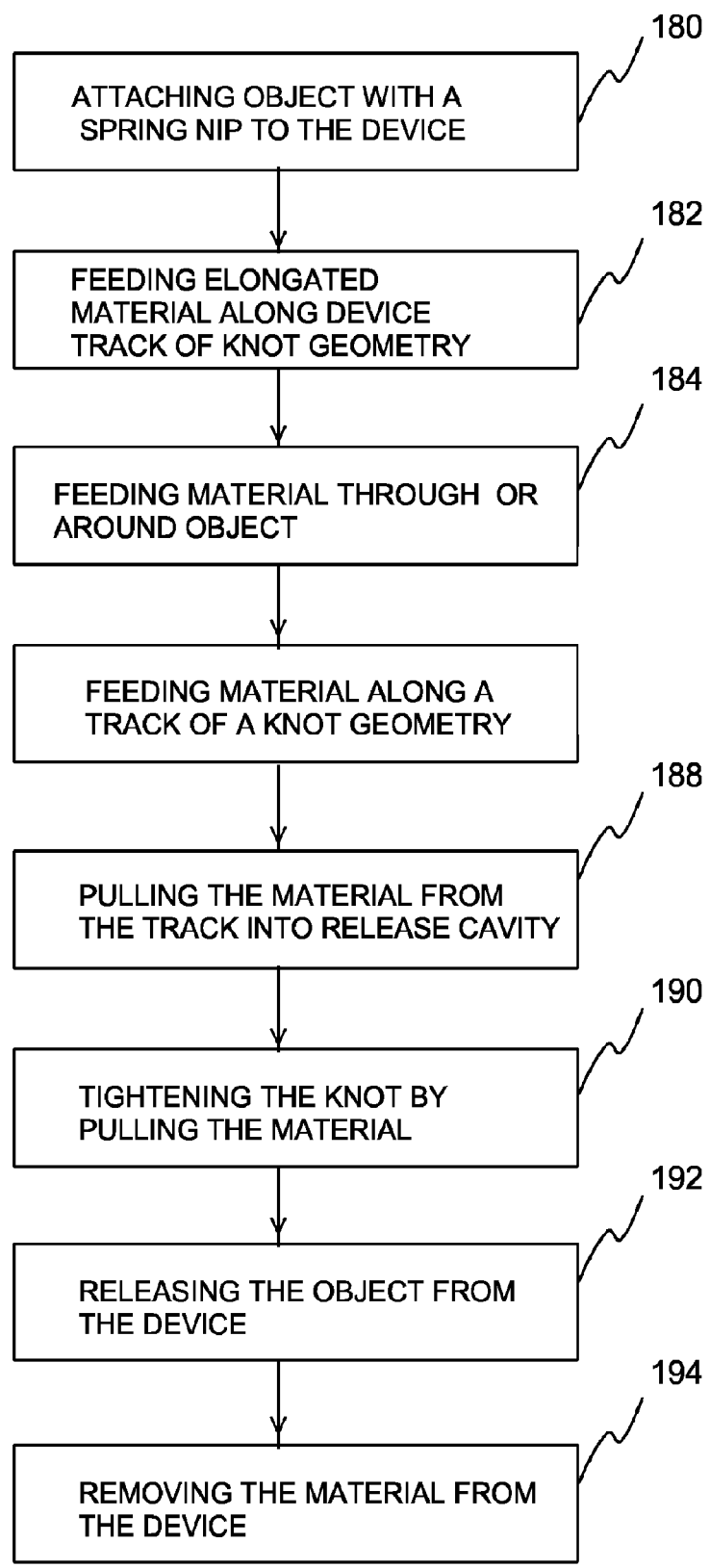
FIG. 10 illustrates a flow diagram of an exemplary method for forming elongated material according to the present invention.

FIG. 10 illustrates a flow diagram of an example for a method according to the invention. In this exemplary method a device according to FIGS. 2a, 2b, 2c and 3 is used.

First an object to be knotted with the material is connected to the device in step 180. The connection is made to the point in the device where it intersects with the track of the device. The temporary attachment to the device can be easily made e.g. with a nip including a spring. However, various other methods of attachment can be used.

Next elongated material is fed to the input aperture of the device, step 182. When the feeding continues the material follows the track within the device. Due to the internal tension of the material it does not get off the track. The track is made into knot geometry in this example.

The material is fed further so that the material is lead through the object to be attached, step 184. After transmitting an attachment loop of the object the material is further fed along the track of knot geometry. When the end of the material comes out from the output aperture of the device the material is pulled in order to release it from the track, step 188. There are release planes within the device which allow the material to move into a release cavity situating preferably in the middle of the device.

The knot is then tightened is step 190 by pulling the material further. After the tightening the free end of the material may be cut into a desired length with cutting means which may be included in the device. Then the object is released from the device in step 192 by opening the locking means such as a spring nip. Finally the material including the object knotted with the material is removed from the device in step 194.

The track is preferably open to a release cavity during the whole process of feeding the material and tightening the knot. Using the device is thus easy since no intermediate phases, e.g. turning parts of the device into different positions, are necessary during the forming process.

Above, solutions according to the invention have been described. The principle according to the invention can naturally be modified within the frame of the scope disclosed, for example, by modification of the details of the implementation and ranges of use.

The examples and embodiments that have been described in this patent application have mainly been related to making knots. Even if this is considered to bee the most advantageous application for the invention, it is still pointed out that the present invention is by no means restricted to these embodiments or to making knots in general. Instead, the invention can also be used for many other various applications. For example, it is possible to form structures with the present invention wherein e.g. elongated metal or plastic is made into a tensioned form in the track of the device. Other structures can then be attached by various means, and as a result pretensioned products can be manufactured.

The invention claimed is:

1. A device for forming elongated material, the device (220-244) comprises:
   a track (220-222, 521) for guiding the material (550) in the device, wherein the track is arranged to guide the movement of the material into a desired form when the material is pushed in the device, whereby an end of the material follows the entire length of the track during the pushing based on the internal tension of the material; and
   an opening (223, 523) at the side of the track, along the entire length of the track, for removing the elongated material from the device after the formation, wherein the track (220-222, 521) of the device forms a closed geometry defining a knot.

2. A device according to claim 1, wherein said elongated material (550) is line.

3. A device according to claim 1, wherein said elongated material (550) is wire or wire cable.

4. A device according to claim 1, wherein the device further comprises a release cavity (224, 524), which is defined by surrounding structure of the device, and said opening (223, 564) allows the elongated material to move from the track to the release cavity.

5. A device according to claim 1, wherein the device further comprises an opening (226, 326) from the release cavity to the side of the device for removing the material from the device after the formation through the opening at the side of the device.

6. A device according to claim 1, wherein the track (220-222, 521) of the device forms a closed geometry.

7. A device according to claim 1, wherein there is an intersection across the track for attachment of an object (252) with the elongated material.

8. A device according to claim 7, wherein the device further comprises means (250) for temporary attachment of the object (252) during the formation of the elongated material.

9. A device according to claim 1, wherein the device further comprises at least two module blocks (230-244, 41, 42) attached to each other, wherein the track (221, 521) is continuous through the interface of the blocks.

10. A device according to claim 9, wherein the at least two blocks can be moved relative to each other into a closed and open state of the device.

11. A device according to claim 9, wherein at least two blocks are substantially similar.

12. A device according to claim 1, further comprising means allowing to connect to the material other structures before the material is released from the track.

13. A device according to claim 1, wherein the device further comprises cutting means for cutting the free end of the elongated material into a determined length.

14. A device according to claim 1, wherein the device further comprises means for pushing the elongated material in order to move the material within the track.

15. A method for forming elongated material, comprising the steps of:
   pushing the material in a device (882);
   giving the material a predetermined formation by guiding the material along a track of the device (886), whereby an end of the material follows the entire length of the track during the pushing at least partially based on the internal tension of the material; and
   removing the material from the device via an opening provided at the side of the track, along the entire length of the track (188, 194), wherein the predetermined formation is a geometry of a knot (186, 190).

16. A method according to claim 15, wherein the elongated material is released from the track into the openings by pulling the material (188).

17. A method according to claim 15, wherein the material is guided along the track via an object, to which said material is connected (184).

18. A method according to claim 15, wherein the free end of the elongated material is cut into a determined length after the formation of the material.

19. A device according to claim 1, wherein said elongated material (550) is fishing line.

* * * * *